(12) United States Patent
Narayanaswami et al.

(10) Patent No.: US 8,107,463 B2
(45) Date of Patent: *Jan. 31, 2012

(54) SYSTEM AND METHOD FOR HISTORY DRIVEN OPTIMIZATION OF WEB SERVICES COMMUNICATION

(75) Inventors: Chandrasekhar Narayanaswami, Wilton, CT (US); Mandayam T. Raghunath, Fishkill, NY (US); Marcel C. Rosu, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 559 days.

This patent is subject to a terminal disclaimer.

(21) Appl. No.: 12/145,158

(22) Filed: Jun. 24, 2008

(65) Prior Publication Data

US 2008/0256171 A1    Oct. 16, 2008

Related U.S. Application Data

(63) Continuation of application No. 11/293,909, filed on Dec. 5, 2005, now Pat. No. 7,808,975.

(51) Int. Cl.
*H04L 12/66* (2006.01)
*G06F 15/16* (2006.01)

(52) U.S. Cl. ........................................ 370/352; 709/201
(58) Field of Classification Search .................. 370/352; 709/201–206
See application file for complete search history.

(56) References Cited

OTHER PUBLICATIONS

Abu-Ghazaleh N et al., "Differential serialization for optimized SOAP performance" High Performance Distributed Computing, 2004, Proceedings 13th IEEE International Symposium on Honolulu, HI, USA Jun. 4-6, 2004, Piscataway, NJ, USA, IEEE, Jun. 4, 2004, pp. 55-64, XP010717440 ISBN: 0-7695-2175-4.
Abu-Ghazaleh N et al., "Differential Deserialization forOptimized SOAP Performance" Supercomputing, 2005, Proceedings of the ACM/IEEE SC 2005 Conference Seattle, WA, USA Nov. 12-18, 2005, Piscataway, NJ, USA, IEEE, Nov. 12, 2005, pp. 21-31, XP010864859 ISBN: 1-59593-061-2.
Werner C et al., "Compressing SOAP messages by using differential encoding" WEB Services, 2004, Proceedings IEEE International Conference on San Diego, CA, USA Jul. 6-9, 2004, Piscataway, NJ, USA, IEEE, Jul. 6, 2004, pp. 540-547, XP010709178 ISBN: 0-7695-2167-3.
Devaram K et al., "SOAP Optimization via Parameterized Client-Side Caching" Proceedings of the IASTED/ISMM International Conference on Parallel and Distributed Computing and Systems, XX, XX, Nov. 3, 2003, pp. 785-790, XP002264158. Takeuchi Y et al., "A Differential-analysis Approach for Improving SOAP Processing Performance" E-Technology, E-Commerce and E-Service, 2005, IEEE '05 Proceedings, The 2005 IEEE International Conference on Hong Kong, China Mar. 29-01, 2005, pp. 472-479, XP010783680 ISBN: 0-7695-2274-2.

*Primary Examiner* — William Deane, Jr.
(74) *Attorney, Agent, or Firm* — Scully, Scott, Murphy & Presser, P.C.; Vazken Alexanian

(57) ABSTRACT

A system, method and computer program product for communicating Web-Services (WS) messages. First there is allocated an identical amount of a cache history storage at each sender and receiver device for storing a history of communicated WS message strings. At the sender, there is generated an intermediate data representations of each message being built, the corresponding message string stored in the cache history storage. The message is communicated as a serialized data string according to the built data representation. For each subsequent message to be communicated, the method comprises identifying identical portions in intermediate data representations of a current message being built and replacing each identified portion in message strings with a reference indicator to a location in the cache history storage corresponding to an identical character string portion associated with a prior message that has been communicated. At the receiver device, the references are identified in received message strings and one or more intermediate data representations locally stored at the receiver device are substituted in the message to complete a build of the received message.

31 Claims, 9 Drawing Sheets

SENDER SIDE

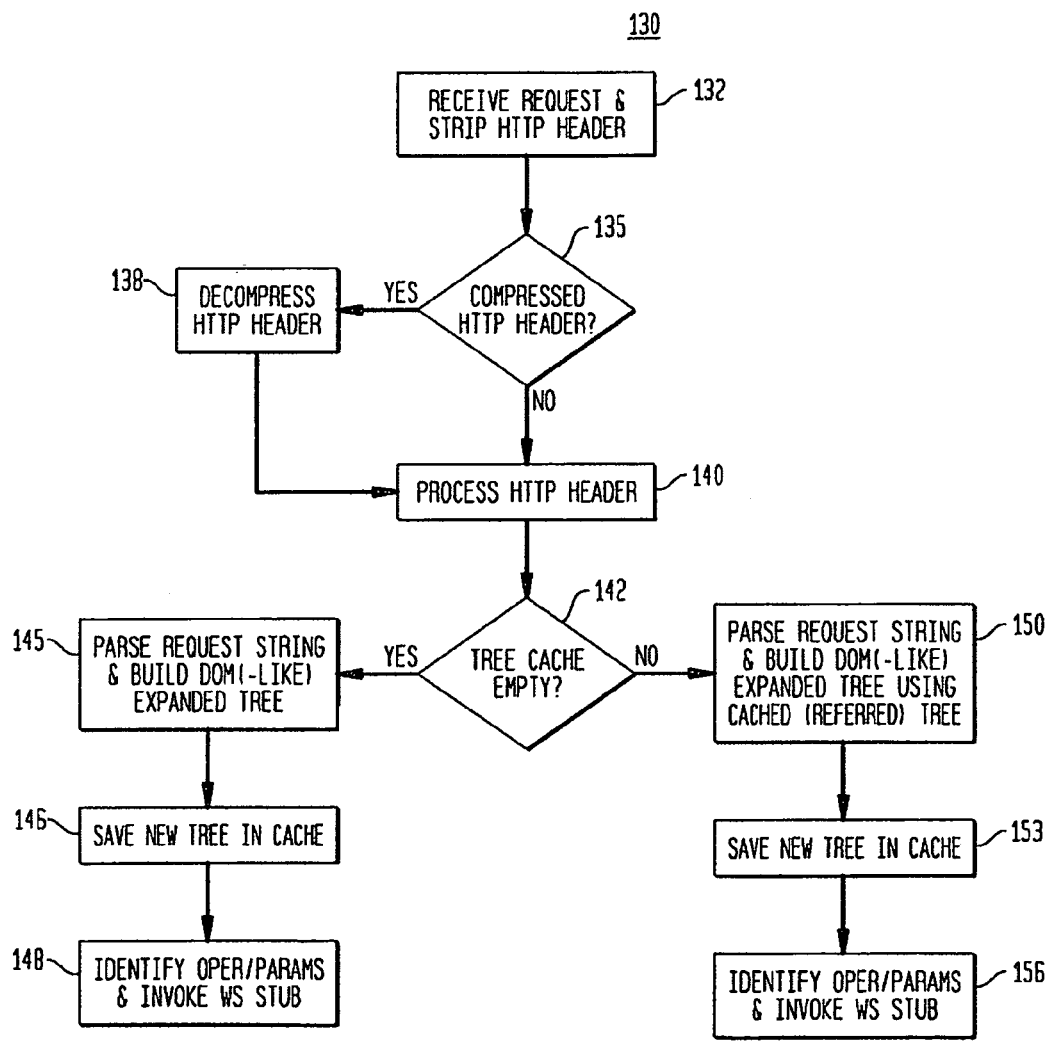

FIG. 5A

```
POST /ws/pid/CheapCalculator HTTP/1.1                              200
Content-Type: text/xml
SOAPAction:
Cache-Control: no-cache
Pragma: no-cache
User-Agent: Java/1.4.2
Host: 127.0.0.1:8080
Accept: text/html, image/gif, image/jpeg, *; q=.2, */*: q=.2
Connection: keep-alive
Content-Length: 215
POST /ws/pid/CheapCalculator HTTP/1.1
                                                                  205

<soapenv:Envelope xmlns:soapenv="http://schemas.xmlsoap.org/soap/envelope/">
    <soapenv:Body>
        <nsl:add xmlns:nsl="http://calc.ibm.com">
            <nsl:in0>7<nsl:in0>
            <nsl:in1>5<nsl:in1>
        </nsl:add>
    </soapenv:Body></soapenv:Envelope>

POST /ws/pid/CheapCalculator HTTP/1.1
Content-Type: text/xml
SOAPAction:                            210
Cache-Control: no-cache
Pragma: no-cache
User-Agent: Java/1.4.2
Host: localhost:8080
Accept: text/html, image/gif, image/jpeg, *; q=.2, */*: q=.2
Connection: keep-alive
Content-Length: 216

<soapenv:Envelope xmlns:soapenv="http://schemas.xmlsoap.org/soap/envelope/">
    <soapenv:Body>
        <nsl:mul xmlns:nsl="http://calc.ibm.com">
            <nsl:in0>3<nsl:in0>
            <nsl:in1>11<nsl:in1>
        </nsl:mul>
    </soapenv:Body></soapenv:Envelope>
```

FIG. 5B

```
HTTP/1.1 200 OK
Server: WebSphere Application Server/6.0
Content-Type: text/html; charset=ISO-8859-1
Content-Language: en-US
Content-Length: 224

<soapenv:Envelope xmlns:soapenv="http://schemas.xmlsoap.org/soap/envelope/">
    <soapenv:Body>
        <ns1:addResponse xmlns:ns1="http://calc.ibm.com">
            <ns1:addReturn>12</ns1:addReturn>
        </ns1:addResponse>
    </soapenv:Body></soapenv:Envelope>
```
215

```
HTTP/1.1 200 OK
Server: WebSphere Application Server/6.0
Content-Type: text/html; charset=ISO-8859-1
Content-Language: en-US
Content-Length: 224

<soapenv:Envelope xmlns:soapenv="http://schemas.xmlsoap.org/soap/envelope/">
    <soapenv:Body>
        <ns1:mulResponse xmlns:ns1="http://calc.ibm.com">
            <ns1:mulReturn>12</ns1:addReturn>
        </ns1:mulResponse>
    </soapenv:Body></soapenv:Envelope>
```
220

FIG. 7A

```
POST /ws/pid/CheapCalculator HTTP/1.1                    280
Content-Type: text/xml
SOAPAction:
Cache-Control: no-cache
Pragma: no-cache
User-Agent: Java/1.4.2
Host: 127.0.0.1:8080
Accept: text/html, image/gif, image/jpeg, *; q=.2, */*: q=.2
Connection: keep-alive
Content-Length: 215
                                                    ┌─285
<soapenv:Envelope xmlns:soapenv="http://schemas.xmlsoap.org/soap/envelope/">
    <soapenv:Body>
        <ns1:add xmlns:ns1="http://calc.ibm.com">
            <ns1:in0>7<ns1:in0>
            <ns1:in1>5<ns1:in1>
        </ns1:add>
    </soapenv:Body></soapenv:Envelope>

┌─290
POST /ws/pid/CheapCalculator HTTP/1.1
Content-Type: text/xml
SOAPAction:
Cache-Control: no-cache
Pragma: no-cache
User-Agent: Java/1.4.2
Host: localhost:8080
Accept: text/html, image/gif, image/jpeg, *; q=.2, */*: q=.2
Connection: keep-alive
Content-Length: 216
                                                     ┌─277
<soapenv:Envelope xmlns:soapenv="http://schemas.xmlsoap.org/soap/envelope/">
    <soapenv:Body>
        <ns1:mul xmlns:ns1="http://calc.ibm.com">
            <ns1:in0>3<ns1:in0>
            <ns1:in1>11<ns1:in1>
        </ns1:mul>
    </soapenv:Body></soapenv:Envelope>
```

FIG. 7B

```
POST /ws/pid/CheapCalculator HTTP/1.1
Content-Type: text/xml
SOAPAction:
Cache-Control: no-cache
Pragma: no-cache
User-Agent: Java/1.4.2
Host: 127.0.0.1:8080
Accept: text/html, image/gif, image/jpeg, *; q=.2, */*: q=.2
Connection: keep-alive
Content-Length: 215

<soapenv:Envelope xmlns:soapenv="http://schemas.xmlsoap.org/soap/envelope/">
    <soapenv:Body>
        <ns1:add xmlns:ns1="http://calc.ibm.com">
            <ns1:in0>7<ns1:in0>
            <ns1:in1>5<ns1:in1>
        </ns1:add>
    </soapenv:Body></soapenv:Envelope>
```

```
POST /ws/pid/CheapCalculator HTTP/1.1
Content-Type: text/xml
SOAPAction:
Cache-Control: no-cache
Pragma: no-cache
User-Agent: Java/1.4.2
Host: localhost:8080
Accept: text/html, image/gif, image/jpeg, *; q=.2, */*: q=.2
Connection: keep-alive
Content-Length: 216
```
— 277

```
<soapenv:Envelope xmlns:soapenv="http://schemas.xmlsoap.org/soap/envelope/">
    <soapenv:Body>
        <ns1:mul xmlns:ns1="http://calc.ibm.com">
            <ns1:in0>3<ns1:in0>
            <ns1:in1>11<ns1:in1>
        </ns1:mul>
    </soapenv:Body></soapenv:Envelope>
```

SYSTEM AND METHOD FOR HISTORY DRIVEN OPTIMIZATION OF WEB SERVICES COMMUNICATION

The present application is a continuation application of U.S. Ser. No. 11/293,909, filed Dec. 5, 2005, the entire contents of which are incorporated herein by reference.

BACKGROUND OF THE INVENTION

1. Field of the Invention

The present invention relates generally to network communications, such as over the Internet/World-Wide-Web and more particularly, to a system and method for reducing communication bandwidth and overheads for entities providing and consuming Web-based services (WS).

2. Description of the Prior Art

Web Services (WS) is a programming model comprising a set of standards developed to provide programmatic access to application logic on a remote machine. This application logic is accessible to clients on every platform, and in every programming language. One of the core Web Services' building blocks is SOAP (Simple Object Access Protocol), a standard framework that allows, but is not limited to, RPC (Remote Procedure Call) messages to be transmitted as XML documents and invokes the capabilities of Web Services. It is known that WS are used extensively not only over the Internet (or Web) but also on enterprise networks, even between machine located in the same site or even room. While WS were initially designed for access across the web, WS are popular inside Intranets, i.e., enterprise networks.

FIG. 1A depicts a typical WS architecture 10 including its logical components. As shown in FIG. 1A, a Web service provider 18 is responsible for deploying Web services and publishes them with a Web service broker 15 that is responsible for service registration and discovery of Web services. Particularly, the broker lists various service types, descriptions, and locations of services that help the service requesters find and subscribe to the required services. A Web service requester 12 is responsible for the service invocation by locating the Web service using the service broker 15, invokes the required services, and executes it from the service provider. More particularly, as described in the book "Developing Java™ Web Services" (Ramesh Nagappan, et al., Wiley Publishing, Inc. 2003), the Web service provider 18 includes a services container 28 that acts as the Web services runtime environment and hosts the service provider. The services container 28 particularly defines the environment meant for client communication implementing a standardized way to describe the network services using a standard XML schema-based specification for describing web services known as Web Services Definition Language (WSDL), and facilitates web service deployment and administration. In addition, it handles the registration of the service description with the service registries 30a,b. Such registries include those implementing a Universal Description, Discovery and Integration (UDDI) standard 30a (www.UDDI.org) or an ebXML registry 30b that defines registry services, interaction protocols, and message definitions, and further acts as a storage for shared information (www.ebXML.org). The web service requestor 12 includes a services delivery component 22 that acts as the client runtime environment by looking up the services registries to find the required services and invoke them from the service provider using SOAP messaging 25. As known, the SOAP protocol includes the following elements: a SOAP envelope that serves as a container for other elements of the SOAP message; a SOAP transport binding for the underlying transport protocol; a set of SOAP encoding rules for representing data in a message (maps instances of application-specific data yes to XML messages); and an application interaction pattern, most often a RPC convention, which is defining the representation for RPC requests and responses and is defined as a way of serializing remote procedure calls and responses as SOAP messages.

FIG. 1B, depicts an exemplary client-server interaction in a conventional SOAP RPC implementation. As shown in FIG. 1B, a client 12 interacts with a service provider (or simply "service") 18 over a network 99 such as the Internet, using a SOAP/HTTP protocol (i.e., a SOAP message protocol using an HTTP transport binding). The SOAP messaging protocol enables messages 25 to be exchanged between the service provider endpoint 18 and the service requester endpoint 12 in request-response pairs. This is the method SOAP uses with the HTTP (Internet) message transport and/or the RPC convention. While SOAP defines how messages should be exchanged over HTTP, it is understood that any communications protocol (e.g., SMTP, MQSeries, Raw Sockets, etc) or method can be substituted for HTTP. In this conventional implementation, client 12 makes remote procedure calls (RPCs) on service provider 18 by sending one message for each call. In a similar manner, service provider 18 responds to these calls by sending one message back to client 12 for each response. The main technique in Web Services is respective processes of composing a SOAP message before sending it and deciphering a SOAP message after receiving it. These processes for a SOAP message are generally performed by creating DOM (Document Object Model), or similar tree-like, objects in memory. In this manner, processes can be performed using the tree representation of the SOAP message without considering the textual representation of the message.

Due to the ASCII nature of XML, implementation of Web Services incorporates significant bandwidth requirements and communication overheads. In addition, WS are self-describing, such that a client and server need only to recognize the format and content of request and response messages. The definition of the WS message format travels with the message; no external metadata repositories or code generation tools are required. Thus, the overheads are obvious when analyzing the content of any SOAP message. Using SOAP and XML not only translates into very large messages, i.e., significant overheads in the TCP/IP stack and increased bandwidth usage, but also in significant parsing overheads, due to the rich structure of SOAP. Furthermore, HTTP, which is WS's most commonly used transport, adds additional communication and parsing overheads.

On the traditional desktop/server platforms, the impact of these overheads has been largely offset by using Gigabit Ethernet networks, faster CPUs and more memory, and by eliminating the performance bottlenecks present in the initial SOAP implementations, such as the Apache Axis engine. Unfortunately, resource-constrained mobile platforms, such as cell phones, PDAs, or laptops, cannot benefit from these solutions. Hardware-oriented approaches don't typically apply to these energy- and size-constrained devices, as faster networks or CPUs, or more memory, consume more power and don't always fit in the desired form factors. Similarly, SOAP engine implementations require additional optimizations to reduce their memory footprints.

In a typical B2B web services deployment scenario, for example, a web service client may make several calls to the service end point, and these calls may have several parameters that do not change from invocation to invocation. Consider for instance several buyers interacting with a seller's web service end point by using web service calls to send purchase orders to the seller. Each purchase order may have several fields, and many of these fields may describe the buyer and will therefore be the same for a particular buyer for each invocation. This type of parameter repetition is mainly due to the stateless nature of web services. Keeping state specific to the combination of (service end-point, client) can enable a better compression ratio of the network traffic than feasible with simple stateless gzip style compression.

A variety of techniques that facilitate the WS services and particularly, message compression, are known in the art. Such techniques include, for example:
1) Hartmut Liefke and Dan Sucin's "XMill: an Efficient Compressor for XML Data" (ACM SIGMOD 2000) describing a tool for compressing XML data, which achieves about twice the compression ratio of gzip at roughly the same speed. XMill separates structure from data, groups related data items, and applies a collection of specialized compressors. Can only be applied after the WS message is generated, which increases message latencies.
2) WAP Binary XML (WBXML) (http://www.w3.org/TR/wbxml/) June 1999, describes splitting XML into predefined tokens, that are binary encoded, and rest, which is encoded inline. Token tables are kept at both send/receive sides. Initially, only token tables for WAP were available; additional tables for SyncML and DRMREL (Digital Rights Management Rights Expression Language) were defined later. Major benefit is that a WBXML-aware SAX parser has very low overhead. Major drawback is that it can only be used for a predefined XML dialect, as token tables for the XML dialect must exist on both ends.
3) Marc Girardot and Neel Sundaresan's "Millau: an encoding format for efficient representation and exchange of XML over the Web", (http://www9.org) May 2000, describes separation of structure from text for compression and takes advantage of associated schema. Extension to WBXML as it compresses the inline text and understands XML basic types. Millan has the same drawbacks as WBXML.
4) Christian Werner, Carsten Buschmann, Stefan Fischer's "Compressing SOAP Messages by using Differential Encoding" (IEEE International Conference on Web Services, July 2004), describes in a first part of the paper comparing bandwidth requirements of SOAP (.NET and Java), RMI-IIOP, Corba, RMI, and gziped SOAP. Second part describes Differential SOAP compression, which sends only the difference between a message and a previous one. In practice, differential encoding works by first computing a collection of skeleton messages by using the WSDL file; next, it computes the difference between a message and a predicted skeleton, which then gets transmitted. In differential encoding, coding and decoding overheads can be significant.
5) M. Tian, T. Voigt, T. Naumowicz, H. Ritter, J. and Schiller's "Performance Considerations for Mobile Web Services" (Elsevier Computer Communications Journal, Volume 27, Issue 11, 1 Jul. 2004, Pages 1097-1105) describes how compression is not always beneficial, especially when it overloads the server.
6) Kenneth Barr and Krste Asanovic's "Energy Aware Lossless Data Compression" (Mobisys 2003, May 2003) describes how with typical compression tools, it takes more energy to compress and send data than sending the uncompressed data. Hardware-aware optimizations of compression tools are shown that reduce the energy used for compression. This paper shows that the compression scheme must be selected carefully.
7) Naresh Apte, Keith Deutsch, and Ravi Jain's "Wireless SOAP: Optimizations for Mobile Wireless Web Services" (poster at www2005.org, May 2005) proposes two optimization techniques: 1) Name Space Equivalency (NPE), and 2) WSDL Aware Encoding (WAE). NPE allows recovery of XML message in a different but equivalent form. WAE requires a mobile device gateway, which creates coding tables for the operations described in the WSDL file. NPE does not appear to deliver significant compression while WAE requires a gateway.
8) Toshiro Takase, Hisashi Miyashita, Toyotaro Suzumura, and Michiaki Tatsubori's "An Adaptive, Fast, and safe XML Parser Based on Byte Sequences Memorization" (www2005.org, May 2005) describes an XML parser ('Deltarser') that uses history to identify previously seen syntactic constructs and reuses the results of the matching constructs. The Deltarser parser reduces parsing overheads on the receiver node but it does not reduce bandwidth requirements nor the overheads of generating the message on the sending node.

It would be highly desirable to provide a system and method that provides one or more optimizations for significantly reducing SOAP messaging processing overheads in deployed Web Services environments.

It would be highly desirable to provide a system and method that provides one or more optimizations for significantly reducing SOAP messaging communication overheads in deployed Web Services environments.

It would be highly desirable to provide a system and method that provides a WS/SOAP messaging compression optimization scheme that provides comparable compression with significantly lower energy and latency costs than existing WS/SOAP messaging compression schemes.

SUMMARY OF THE INVENTION

The present invention is directed to a system, method and computer program product that provides one or several optimizations for significantly reducing SOAP messaging overheads in deployed Web Services environments.

More particularly, the present invention provides a solution that takes advantage of the repetitive nature of the WS traffic between two endpoints to identify a series of optimizations across several layers in the SOAP and HTTP engines of the two devices. More specifically, both devices will keep a history of the most recent number "N" WS-related bytes received and sent in each direction. The size of the history does not have to be the same for both directions, but the sending and the receiving ends for a direction must use exactly the same history size. The reliable, in-order delivery of WS guarantees that the two ends have a consistent view of the common history.

Communication overheads are reduced by replacing well-defined elements in the SOAP message with references in previous messages. Both sending and receiving ends replace in their history buffers, the references with the strings they refer to: this enables the same, or similar compressions in subsequent messages sent in the same direction.

Thus, according to one aspect of the invention, there is provided a system, method and computer program product for communicating messages. The method for communicating messages comprises:
  allocating an amount of a first cache storage at each of a
    sender device and a receiver device, the cache for storing
    character strings corresponding to communicated and
    received message strings at respective sender and
    receiver devices; and, building an intermediate data structure representing a message to be communicated, the intermediate data structure adapted for storage in a second cache storage at the sender device; and, building a message string to be communicated based on the built intermediate data structure; and, for each subsequent message to be communicated:

identifying portions in a built intermediate data structure for a current message being built with portions that are identical to like portions present in a built intermediate data structure corresponding to a prior communicated message string;

building a message string to be communicated based on the current built intermediate data structure and replacing each identified portion in message strings with a reference indicator to a location in the first cache storage corresponding to an identical character string portion associated with the prior message that has been communicated; and, at the receiver device, identifying a reference indicator in a received message string and substituting one or more cached identical character string portions stored in the first cache storage at the receiver device to build the received message, whereby message communication infrastructure resources at the sending and receiving device are conserved.

In one embodiment of the invention, the intermediate data structure comprises a structured tree representation of a message, with the identified string portions comprising one or more sub-tree or tree fragments.

In one embodiment of the invention, the allocation of cache history storage at the sender and receiver device comprises: implementing an initial handshake protocol between the devices for communicating the first cache storage amount to be allocated. Further to this embodiment, the allocated amount of first cache storage at the receiver device is at least as much as a first cache size allocated at the sender device.

In one embodiment of the invention, the reference indicator refers to attributes of a serialized message string portion corresponding to an identified sub-tree or fragment portion in a built intermediate data structure that is identical to a like sub-tree or fragment portion present in a built intermediate data structure corresponding to a prior communicated message string.

An attribute may comprise one or more of: an indication of a prior sent message, a message ID identifying the tree representation of a prior communicated message, the length of the string corresponding to the identified tree, and, the length of offset in the prior communicated message.

Furthermore, in one implementation of the invention, at the receiver device, identification of identical portions comprises: parsing the received message string and building a structured tree representation for storage in a second cache storage at the receiver device. The structured tree representation is stored for subsequent use in building received messages at the receiver.

Advantageously, candidates for replacement include elements of a communications protocol header, (e.g., the HTTP header) and WS message (e.g., SOAP envelope). However, more advanced optimizations are available that replace operations, names and even parameters or results.

BRIEF DESCRIPTION OF THE DRAWINGS

The objects, features and advantages of the present invention will become apparent to one skilled in the art, in view of the following detailed description taken in combination with the attached drawings, in which:

FIG. 4 is a flow chart describing the Receiver side SOAP/HTTP processing in accordance with the optimization of the present invention;

FIGS. 5A, 5B example WS SOAP traffic is shown communicated in both directions (client to server in FIG. 5A and server to client in FIG. 5B) for two consecutive WS invocations;

DETAILED DESCRIPTION OF THE PREFERRED EMBODIMENTS

Figure 1A:
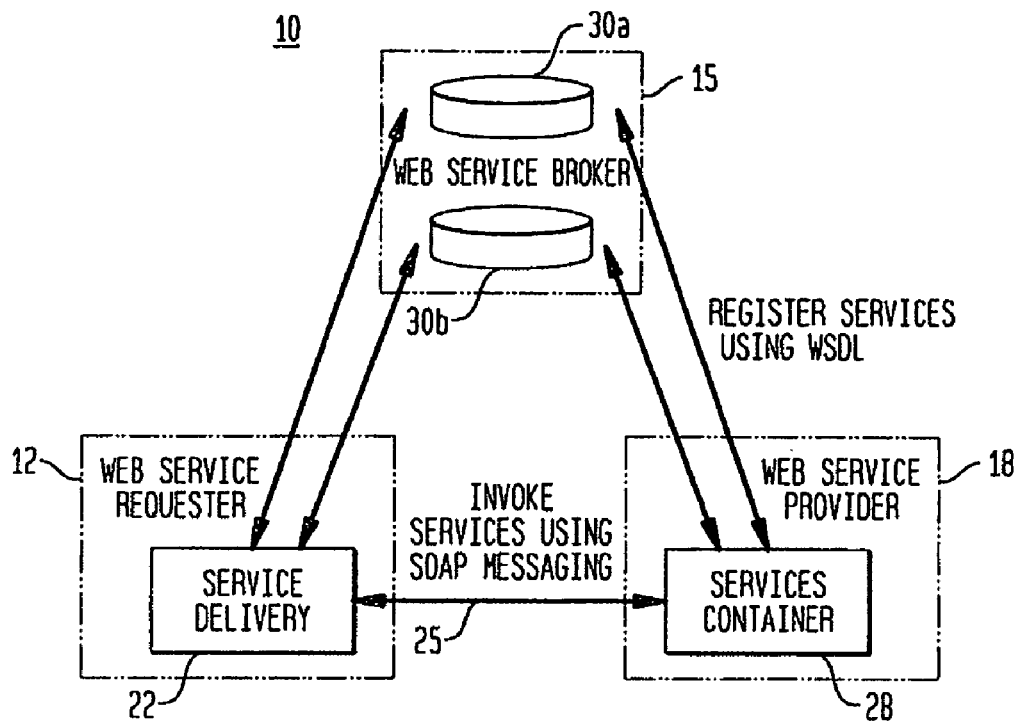
FIGS. 1A and 1B provide a Web Service's architecture 10 (FIG. 1A) and messaging diagram 25 (FIG. 1B) in which the present invention is implemented.
Figure 1B:
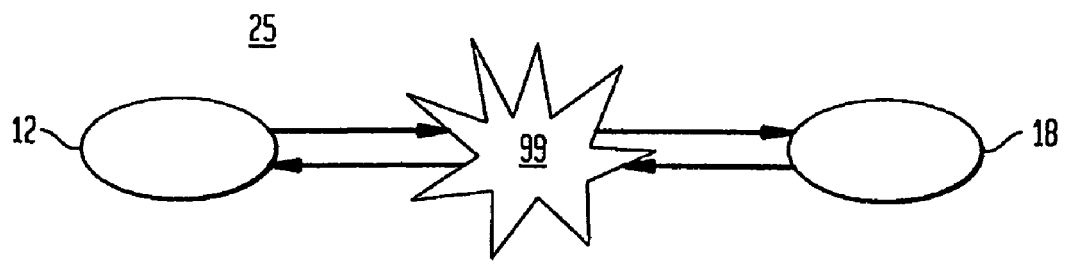

The present invention provide a system, method and computer program product for providing one or more optimizations for significantly reducing SOAP messaging overheads in deployed Web Services environments such as shown in FIGS. 1A,B. Reference may be made in this specification to the following publications, available either in printed form or online and incorporated herein by reference:

1. W3C® Note, "Web Services Description-Language (WSDL) 1.1", Mar. 15, 2001;
2. W3C® Recommendation, "Extensible Markup Language (XML) 1.0 (Second Edition)", (Oct. 6, 2000) (http://www.w3.org)
3. W3C® Recommendation, SOAP Version 1.2 Part 0: Primer (Jun. 24, 2003);
4. W3C® Recommendation, SOAP Version 1.2 Part 1: Messaging Framework (Recommendation);
5. W3C® Recommendation, SOAP Version 1.2 Part 2: Adjuncts (Recommendation);
6. W3C® Recommendation, SOAP Version 1.2 Specification Assertions and Test Collection;
7. W3C® Recommendation, SOAP Message Transmission Optimization Mechanism (Jan. 25, 2005);
8. W3C® Recommendation, XML-binary Optimized Packaging; and
9. W3C® Document Object Model (DOM) (http://www.w3.org/DOM/)

According to the first optional extension to the SOAP messaging protocol, a new HTTP option is provided in a first request message that proposes a history size for the particular direction, e.g., sending. If the other (e.g., receiving) endpoint implements the extension, it will reply with a history size for the response direction, and possibly with a request for a smaller history size for the opposite direction. This initial handshake is remotely similar to the SACK (Selective Acknowledgement) extension of the TCP protocol. The ability to negotiate history sizes was added to this handshake protocol. Subsequent adjustment of history size, in either direction, is performed by proposing a new history size byte number. Acceptance or rejection is signaled in the reply message.

Figure 2A:
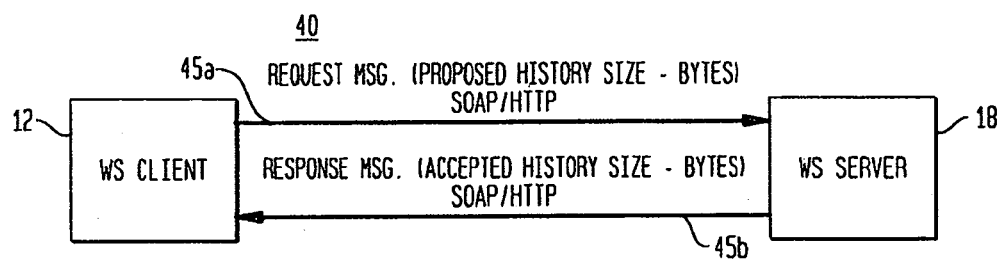
FIGS. 2A and 2B depict the Handshake Protocol used to determine if both receiving and sending ends implement the optimization of the present invention and, to set the history size at both ends to the same value.
Figure 2B:
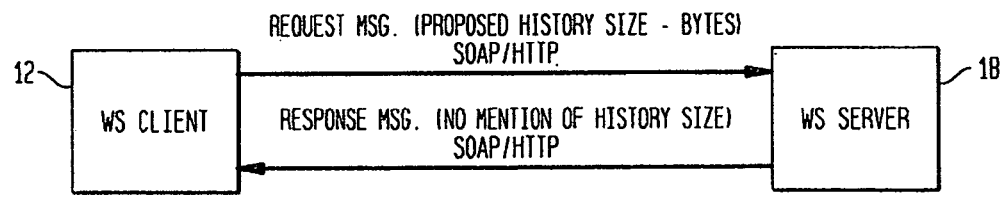

FIGS. 2A and 2B particularly depict the Handshake Protocol 40 used to determine if both WS receiving endpoint (WS client) 12 and WS sending endpoint (WS server) 18 implement the optimization of the present invention and, to set the history size at both ends to the same value.

As shown in FIG. 2A, the Web Service client 12 in a first handshake message 45a proposes a value for the history size, which additionally indicates to the server that the client implements the proposed optimization. If the Web service server 18 implements the optimization and it has the required memory available, it returns the same history size or a smaller value in a handshake reply message 45b. Otherwise, as shown in FIG. 2B, the Web service server 18 ignores the proposed history size. There are multiple ways to implement this. For instance, a WS-based implementation may use an additional operation, with a predefined name and signature, which is added to all the endpoints implementing the optimization. Thus, for example, the first call from a client 12 would be a WS invocation of this operation and the server 18 returns a value for the history size (FIG. 2A) or a SOAP fault, if it does not understand the request, i.e., it does not implement the proposed optimization (FIG. 2B). This implementation has the disadvantage of requiring an additional WS invocation. Alternative implementations use a new HTTP header field or an XML comment in the prolog for the negotiation described above. The later implementations do not require an additional WS invocation, as the Handshake protocol 40 piggybacks on the first application invocation. The handshake protocol 40 may additionally be used to modify the history size or end the usage of the proposed optimization later during the interaction. In those scenarios, the re-negotiation can be initiated by the WS server, if one of the later implementations is used.

It should be understood that the history size of the cache that is negotiated in the handshake message 45a is 'managed' memory, i.e., a cache allocated for storing the SOAP message string history only. Memory used to cache (sub)trees (e.g., a tree cache), the contents of which is determined by the strings kept in the string cache, is not negotiated according to this handshaking protocol and this memory does not have to be the same at both client (sender) and receiver ends. Only the cache allocated for storing the SOAP message string history has to have the same size at both ends.

Figure 3:
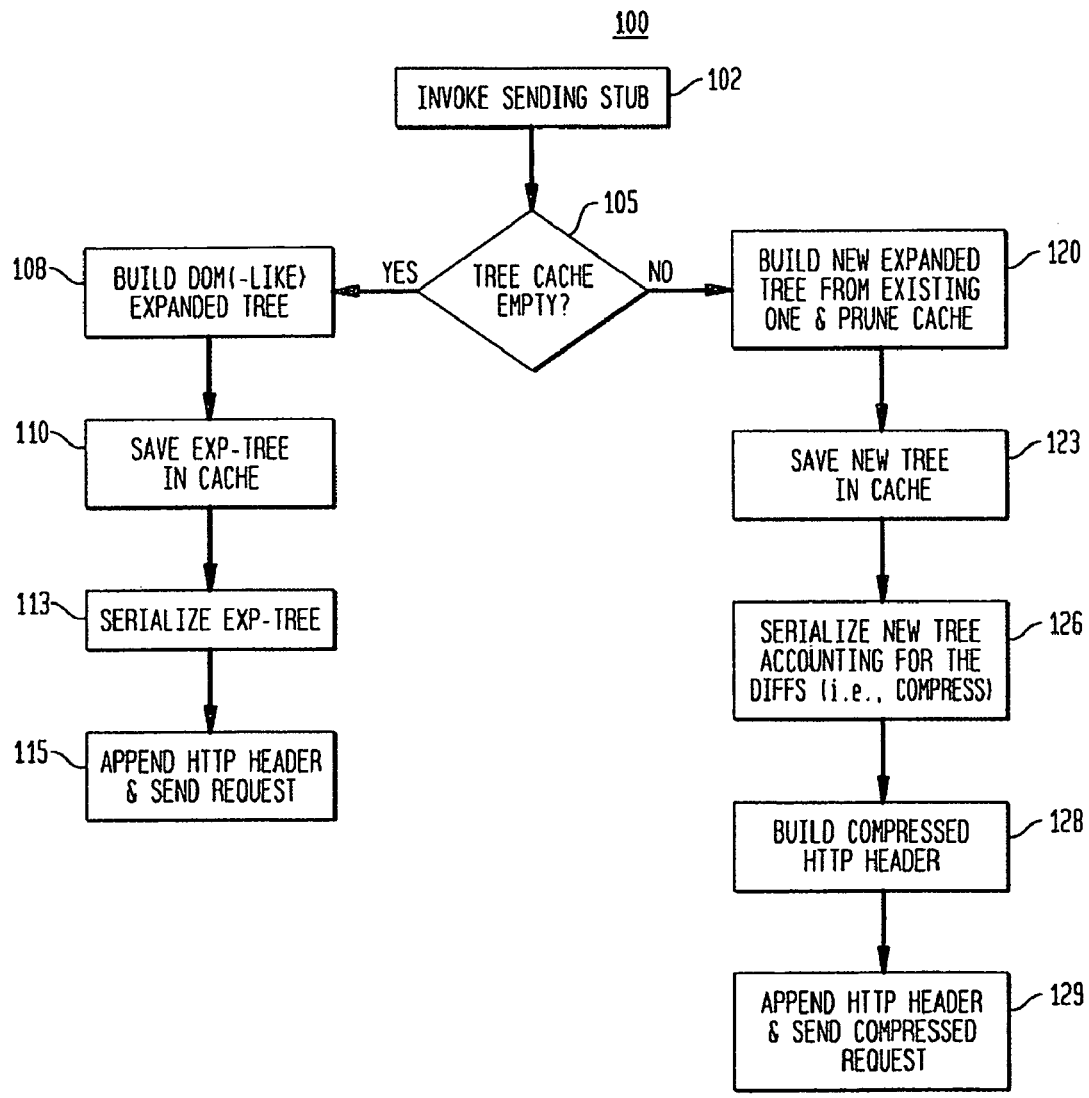
FIG. 3 is a flow chart describing the Sender side SOAP/HTTP processing in accordance with the optimization of the present invention.

FIG. 3 is a flow chart describing the Sender side SOAP/HTTP processing in accordance with the optimization of the present invention.

In FIG. 3, in the generation of the WS stack at the sending endpoint, the compression according to the present invention is performed, i.e., the replacements of the SOAP message elements are identified while the SOAP message is being built. This is in contrast to typical string compression schemes that act by comparing the new message with the available history. More specifically, various components of the SOAP engine at the sending endpoint will have to keep short histories of the SOAP components still available in the local history. The compression is deeply integrated with the SOAP outgoing path and therefore, takes full advantage of the semantics of the SOAP protocol. It is expected that this feature provides comparable compression with significantly lower energy and latency costs than existing schemes, with the additional benefit that the more there is communicated, the more there is learned, i.e., the more that can be compressed if enough history is kept. As a result, it is further possible to adjust the history size using an adaptive algorithm, that is, the client and sender sides can re-negotiate an amount of cache history size that each side is to maintain. It is understood however, that both sides maintain the same amount of message string cache. For this algorithm to work, the receiver has to maintain at least as much cache as the sender or a greater amount.

In the implementation according to the present invention, at the sending side where SOAP messages are generated as shown in FIG. 3, the methodology 100 implemented at a client device includes the typical step of invoking a sending stub. The executing code (routines) and WS stack infrastructure upon which the stub runs and that has been modified according to the present invention, is established at step 102 that enable routing of transactions (e.g., method invocations) to the WS object on the server and/or enable interaction with a server object to invoke web services. Then, at step 105, assuming a cache history has been prior negotiated (for storing the DOM (-like) tree data structure contents at the sender and receiver) according to a prior handshake protocol, a determination is made as to whether the tree cache is empty. This cache may be empty prior to, or at the time a first message to be sent when no history has been built. If the tree cache is empty as determined at step 105, then the next step involves building the hierarchical Document Object Model DOM(-like) tree structure at step 108 that enables dynamic access and update of a document, and storing the build tree into the tree cache. Then, at the next step 113, the tree is serialized, e.g., by implementing routines for converting the stored tree data structure into a stream of characters that can be reassembled back into an identical copy of the original message data structure at the sender. Finally, at step 115, the serialized byte stream is appended (wrapped) with the HTTP header and the request is sent to the server.

Referring back to FIG. 3, at step 105, according to the optimization modifications if the invention, if it is determined that the tree cache is not empty, i.e., it includes a history comprising previously built DOM (-like) tree data structure(s) or sub-trees or tree fragments (e.g., branches) from a first and/or prior messages, then the next step involves building an expanded tree structure from the existing tree structure in the cache as shown at step 120. Note that if the amount of cache size available for saving the string representation of the expanded tree structure is not available, older built trees or portions (sub-trees or tree fragments) thereof may be pruned at step 120. Either way, the expanded tree structure is saved as indicated at step 123. In this optimization, an existing cached tree structure is built upon using elements of previous tree (sub-tree or fragments), thus, obviating the need to build a tree from scratch and conserving processing resources. Continuing at step 126 in analyzing the message and building its string representation, the expanded tree structure is serialized, converted into data bytes suitable for transmission. However, for the optimization of the present invention, not all of a built tree needs to be serialized. That is, a compression is applied whereby a string that has been sent in a previous message (e.g., corresponding to a sub-tree or tree fragment, for instance, is replaced with a back-reference pointer that indicates where in the string cache history that message portion has been sent. Such a back-reference pointer or like indicator is provided in place of the string and has attributes that point to where in the cache history the tree section exists, e.g., how many bytes to look back in the string cache history in order to retrieve the built string associated with a prior used sub-tree or tree fragment data structure, and, an indication of the amount of characters that were generated for that sub-tree or tree fragment. In this manner, a compression is performed in that the tree contents do not have to be sent, only a substituted back reference pointer that enables the receiver WS stack processing to retrieve the exact contents stored in its cache history and build the associated message. Then, at step 128, there is performed the step of compressing the network protocol header responsible for communicating the SW messages, e.g., HTTP header. Thus, finally, the compressed HTTP header is appended to the serialized byte stream and the compressed request is sent at step 129.

In one embodiment, it is advantageous to perform a compression of the HTTP header, as the HTTP header potentially could represent a significant fraction of the SOAP message. This is true for all HTTP bindings currently defined or envisioned, for both HTTP request and response messages. For SOAP stacks designed for embedded systems and for relatively simple invocations, this fraction can be especially large, e.g., as shown in exemplary HTTP header message contents 202, 203 in the example WS invocations 200 shown in FIGS. 5A and 5B. On the sender side, HTTP headers are compressed using a method very similar to string compression but with much lower overheads. For example, HTTP compression may be performed by implementing a modified LZW (Lempel Ziv Welch) algorithm, the 'modification' consisting of applying LZW on the previously sent HTTP headers only, and, not on the entire string cache. This is because the stack component performing the compression knows that there are only a few substrings that the new header can be compared with successfully: the headers of previously sent messages. On the receiver side, the compressed header is replaced by the substring it refers, i.e., the header of a previously received message, and passed to the web container, i.e., the HTTP processing layer, together with whatever information this layer has attached to the substring during its processing. This additional information, which consists mostly of (attribute, value) pairs, was saved to help subsequent processing of the substring; using the attached information lowers the overhead of HTTP processing on the receiver side. Thus, step 129 in FIG. 3 contemplates the step of appending a compressed HTTP header.

As known, a DOM parser creates a tree structure in memory from an input document. DOM is a platform- and language-neutral interface that allows programs and scripts to dynamically access and update the content, structure and style of documents. It additionally provides a specification for representing XML documents as a hierarchy of Node objects that also implement other, more specialized interfaces (see http://www.w3.org/DOM/#specs). Some types of nodes may have child nodes of various types, and others are leaf nodes that cannot have anything below them in the document structure. WS stack implementations use DOM interfaces/parsers handle SOAP messages; however, other types of structured language parsers, e.g., a SAX parser, may be used without detracting from the spirit and scope of the invention. Thus, the DOM approach may be replaced by use of SAX parsers (Simple API for XML, current version is SAX 2.0.1) to build the tree representation of an incoming SOAP message.

Thus, expanding upon FIG. 3 in greater detail, it is known that a tree-based API is centered around a tree structure and therefore provides interfaces on components of a tree such as Document interface, Node interface, NodeList interface, Element interface, Attr interface and so on, for the (which is a DOM document). The WS stack implementation which supports the optimizations of the present invention, uses a similar approach. However, at least three additional node attributes are used: 1) the length of the XML string corresponding to the tree rooted at that node; 2) the message ID that the tree represents to identify the message; and, 3) the offset in the message. These attributes are used to generate the back-pointer added in place of the serialized sub-tree section or tree fragments data representations.

Elaborating upon the tree cache structure evaluated at step 105, the tree cache is a collection of trees/subtrees corresponding to the last few messages sent or received or fragments of these messages; as new messages are sent or received, the oldest one(s) are discarded. There is a maximum number of trees/messages that the sender can use; similarly, there is a minimum number of messages/trees that the receiver should keep. The two numbers are determined as the shortest message history with a cumulative length greater than the negotiated history size. Thus, elaborating upon the step 126, FIG. 3, the tree cache implementation avoids storing multiple copies of identical sub-trees and facilitates the construction of new trees (reuse) from existing ones.

Thus, elaborating upon the sending side functionality for building tree (steps 123-126) when composing a new message, the modified WS stack attempts to reuse as many subtrees as possible from the tree cache content. In the SOAP message, the reused subtrees translate into references to XML substrings in messages previously sent. Only subtrees corresponding to messages guaranteed to be in the receiver cache are used to create back-references in the SOAP/XML message.

FIG. 4 is a flow chart describing the Receiver side SOAP/HTTP processing in accordance with the optimization according to the present invention. In the implementation according to the present invention, at the receiving side, where SOAP messages are received as shown in FIG. 4, the methodology 130 implemented at the server includes: receiving the client SOAP message (request) and stripping the HTTP header (step 132). Then, at step 135, a determination is made as to whether the HTTP header has been compressed. If at step 135 it is determined that the HTTP header has been compressed, then at step 138, the HTTP header is uncompressed and the process proceeds to step 140 indicating the formal processing performed on the HTTP header when a message has been received. Otherwise, if it is determined at step 135 that the HTTP header is not compressed, then the process proceeds to step 140 which indicates the formal processing performed on the HTTP header when a message has been received. After processing step 140, a determination is made at step 142 as to whether the cache (for storing the DOM (-like) tree data structure contents) is empty. This server (receive side) cache may be empty the time a first message from this particular sender is received as no history has yet been built at the receiver. If the tree cache is empty as determined at step 142, then receive side processing is performed including steps such as: parsing the request string and building a DOM(-like) tree (step 145); saving the new tree in the tree cache (step 146); and, identifying operations/parameters in the request and invoking the WS receiver-side stub (step 148). It is understood that the client processes incoming messages as well which constitute responses from the server.

At the receiving side where SOAP/HTTP messages are received, if it is determined at step 142 that the tree cache (for storing the DOM (-like) tree data structure contents) is not empty, then the next step involves parsing the request string and building the DOM(-like) expanded tree at step 150. However, in this embodiment, the built tree utilizes a prior cached (referred) sub-tree or tree fragment data representation that has been previously stored in the local string cache history from a prior message (invocation). According to the invention, when building the tree corresponding to a received message, the receiver uses cached subtrees as instructed by the back-reference pointers in the incoming SOAP/XML messages, if any. That is, when explicit XML content is received, a new subtree is constructed and inserted in the tree representing the message. The new tree may reuse large fractions of existing trees in the receiver cache, as indicated by the back-references in the incoming message. Then, the new DOM(-like) expanded tree structure is saved in the cache, as indicated at step 153. Finally, at step 156, the operation/parameters are identified and a WS receive stub invoked for responding to the received message by invoking the WS functionality as indicated at step 156.

Thus, at the receiving endpoint, where decompression is performed, the following optimizations are provided in accordance with the present invention. Particularly, any back reference pointers are replaced by strings in the local string cache history and integrated in the received message stream. Preferably, a reference is always replaced by a string that was previously parsed by the incoming path of the local SOAP engine. Once parsed, strings are annotated with their HTTP/SOAP-level labels, such as URL, EncodingStyleToken, etc. The present invention thus proposes modifications to the incoming path to allow the direct integration of the pre-parsed string into the parsing of the received WS message. This will result in parsing each of the compressed strings segments only once.

In a very simple example of a compression operation performed according to the invention, reference is now made to FIGS. 5A, 5B that particularly depict example message traces illustrating the types of repetition in WS invocations and responses 200. The traces are captured w/a tool called TCP-Monitor, part of Axis, which is an open-source implementation of the SOAP specification and it is available from the Apache web site (www.apache.org). In FIGS. 5A, 5B example WS SOAP traffic is shown communicated in both directions (client to server in FIG. 5A and server to client in FIG. 5B) for two consecutive WS invocations. As shown in FIG. 5A, the first request (from client to server) includes a HTTP header 202 followed by the SOAP message for the 'add' invocation 205. In the example for the operation 'add', the two example parameters are '7' and '5'. In the second request (from client to server) a HTTP header 203 is followed by the SOAP message for the second invocation 210 a 'mul' operation with the example parameters '3' and '11'. FIG. 5B illustrates the respective response messages (the message communicated from server to the client) 215, 220 to response to the first 'add' and second 'mul' invocations 205, 210, respectively.

Figure 6:
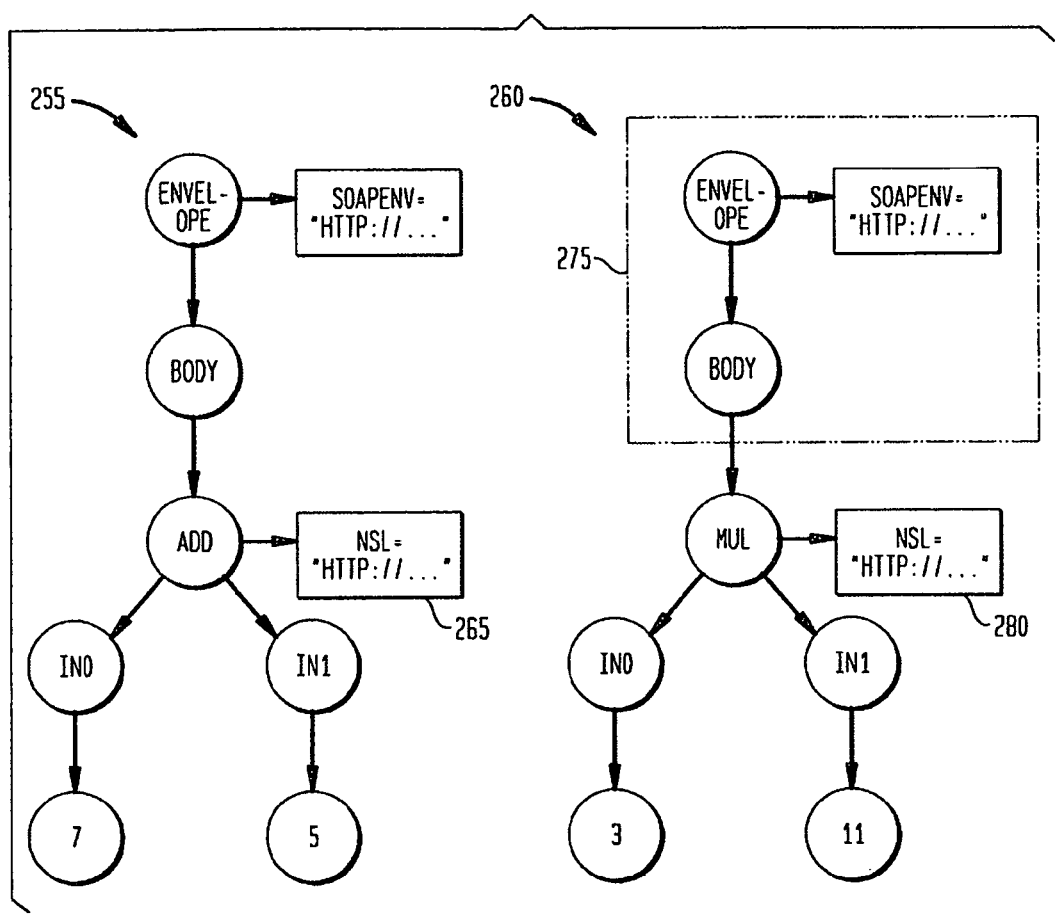
FIG. 6 depicts respective tree representations 255, 260 of the two request messages 205, 210 shown in FIG. 5A; and, FIGS. 7A, 7B illustrate the respective overlap between respective strings 285, 290 corresponding to the two in the SOAP message/HTML headers in the request message invocations 205, 210 of FIG. 5A.

FIG. 6 depicts respective tree representations 255, 260 of the two request messages 205, 210 shown in FIG. 5A. The common message fragment 275 in each of the two invocations (overlap) is shown. It is noted that only the SOAP part of the message is represented as a tree, i.e., the HTTP header isn't. Attributes are represented as square nodes 265, 280, attached to the element nodes (circles).

FIG. 7A illustrates the overlap 277 between respective strings 285, 290 corresponding to the two SOAP request messages 205, 210 of FIG. 5A. The modified WS stack replaces the highlighted areas with the back reference pointers, using a compact encoding. FIG. 7B illustrates the overlap 297 between the same two request messages, but in their HTTP headers. This optimization requires changes in the HTTP engine supporting the SOAP engine which are both part of the WS stack.

Advantageously, the mechanism of the present invention requires modifications to the incoming path, and is expected to yield substantial saving in CPU time and memory consumptions, which will translate in significant energy savings during WS message processing.

Note that the optimizations proposed do not have to be symmetric. The optimization can be enabled only in one direction when two devices have very different resource characteristics, such as for a desktop/cell phone pair, or when messages in one direction are dominated by a pseudo-random component, such as a very large encrypted result. To disable the optimization in a given direction set the history size to zero.

The present invention has been described with reference to diagrams of methods, apparatus (systems) and computer program products according to embodiments of the invention. It will be understood that each diagram can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified herein.

These computer program instructions may also be stored in a computer-readable memory that can direct a computer or other programmable data processing apparatus to function in a particular manner, such that the instructions stored in the computer-readable memory produce an article of manufacture including instruction means which implement the functions specified herein.

The computer program instructions may also be loaded onto a computer-readable or other programmable data processing apparatus to cause a series of operational steps to be performed on the computer or other programmable apparatus to produce a computer implemented process such that the instructions which execute on the computer or other programmable apparatus provide steps for implementing the functions specified herein.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A method for communicating messages comprising:
   allocating an amount of a first cache storage at each of a sender device and a receiver device, said cache for storing character strings corresponding to communicated and received message strings at respective sender and receiver devices; and,
   building an intermediate data structure representing a message to be communicated, said intermediate data structure adapted for storage in a second cache storage at said sender device; and,
   building a message string to be communicated based on said built intermediate data structure; and, for each subsequent message to be communicated:
   identifying portions in a built intermediate data structure for a current message being built with portions that are identical to like portions present in a built intermediate data structure corresponding to a prior communicated message string;
   building a message string to be communicated based on said current built intermediate data structure and replacing each identified portion in message strings with a reference indicator to a location in said first cache storage corresponding to an identical character string portion associated with the prior message that has been communicated; and, at said receiver device, identifying a reference indicator in a received message string and substituting one or more cached identical character string portions stored in said first cache storage at said receiver device to build the received message, whereby message communication infrastructure resources at said sending and receiving device are conserved.

2. The method as claimed in claim 1, wherein said steps of building a message string to be communicated comprises serializing said built intermediate data structure to form a message string.

3. The method as claimed in claim 2, wherein said intermediate data structure comprises a structured tree representation of a message, said identified string portions comprising one or more sub-tree or tree fragments.

4. The method as claimed in claim 1, wherein said allocating said cache history storage at said sender and receiver device comprises: implementing an initial handshake protocol between said devices for communicating said first cache storage amount to be allocated.

5. The method as claimed in claim 4, wherein said allocated amount of said first cache storage at said receiver device is at least as much as a first cache size allocated at said sender device.

6. The method as claimed in claim 3, wherein said reference indicator refers to attributes of a serialized message string portion corresponding to an identified sub-tree or fragment portion in a built intermediate data structure that is identical to a like sub-tree or fragment portion present in a built intermediate data structure corresponding to a prior communicated message string.

7. The method as claimed in claim 6, wherein an attribute comprises an indication of a prior sent message.

8. The method as claimed in claim 6, wherein an attribute comprises a message ID identifying the tree representation of a prior communicated message.

9. The method as claimed in claim 6, wherein an attribute comprises the length of the string corresponding to the identified tree.

10. The method as claimed in claim 6, wherein an attribute comprises the length of offset in the prior communicated message.

11. The method as claimed in claim 3, wherein at said receiver device, said identifying portions comprising: parsing said received message string and building a structured tree representation for storage in a second cache storage at said receiver device, said structured tree representation being stored for subsequent use in building received messages at said receiver.

12. The method as claimed in claim 11, further comprising: continuously updating said tree representations of said identical portions in said second cache storage at said sender and receiver devices as new messages are respectively sent and received.

13. The method as claimed in claim 11, wherein said message includes a web-services message generated according to a simple object access protocol (SOAP), said replaced message string portions comprising identical nodes of a SOAP message.

14. The method as claimed in claim 13, wherein said SOAP message is transmitted according to a communications protocol, said replaced message portions comprising identical portions of a communications packet header.

15. The method as claimed in claim 14, wherein said SOAP message is transmitted according to the HTTP communications protocol, wherein said replaced message portions comprise elements of the HTTP header and SOAP message.

16. The method as claimed in claim 4, wherein an amount of said first cache history storage allocated at each client sender device and a receiver device is fixed, whereby, as new messages are sent or received, older one or more sub-tree or tree fragments one(s) are discarded as corresponding string messages are dropped in said first cache storage.

17. The method as claimed in claim 14, wherein an amount of first cache storage allocated at each client sender device and a receiver device is adaptable for expansion or contraction as long as each cache history storage amount at said receiver is equal to or greater than at each client sender device.

18. An apparatus for communicating messages in a web environment comprising:

a means at a sender device supporting a web services (WS) stack implementation for generating WS message strings to be communicated to a receiver device, said message strings communicated being stored in a first cache storage device at said sender device and stored in a first cache storage at said receiver device;

a means at a receiver device supporting a WS stack implementation for responding to received WS message requests strings communicated to said receiver device, each said WS stack implementation at said sender and receiver devices building and storing intermediate data structures representing sent and received WS message string content and locally storing built intermediate data structures at respective sender and receiver devices;

said WS stack implementation at said sender device implementing means for building a message string to be communicated based on a current built intermediate data structure and replacing each identified portion in message strings with a reference indicator to a location in said first cache storage corresponding to an identical character string portion associated with the prior message that has been communicated; and, said WS stack implementation at said receiver device identifying a reference indicator in received message string and substituting one or more cached identical character string portions stored in said first cache storage at said receiver device to build the received message, whereby WS message communication infrastructure resources at said sending and receiving device are conserved.

19. The apparatus as claimed in claim 18, wherein said means at a sender device supporting a web services (WS) stack implementation comprises a WS (simple object access protocol) SOAP engine for generating said WS SOAP message requests.

20. The apparatus as claimed in claim 18, further comprising means for implementing an initial handshake protocol between said sender and receiver devices for negotiating an amount of first cache storage memory for locally storing a message string history at respective sender and receiver devices, with the amount of first cache storage for said receiver device always equal to or larger than the sender first cache storage.

21. The apparatus as claimed in claim 18, wherein said built intermediate data structure comprises a structured tree representation of a message, said identified string portions comprising one or more sub-tree or tree fragments.

22. The apparatus as claimed in claim 21, wherein said reference indicator refers to attributes of a serialized message string portion corresponding to an identified sub-tree or fragment portion in a built intermediate data structure that is identical to a like sub-tree or fragment portion present in a built intermediate data structure corresponding to a prior communicated message string.

23. The apparatus as claimed in claim 22, wherein an attribute comprises an indication of a prior sent message.

24. The apparatus as claimed in claim 22, wherein an attribute comprises a message ID identifying the tree representation of a prior communicated message.

25. The apparatus as claimed in claim 22, wherein an attribute comprises the length of the string corresponding to the identified tree.

26. The apparatus as claimed in claim 22, wherein an attribute comprises the length of offset in the prior communicated message.

27. The apparatus as claimed in claim 22, wherein said WS SOAP message is transmitted according to the HTTP communications protocol, wherein said replaced message portions comprise elements of the HTTP header and SOAP message.

28. The apparatus as claimed in claim 21, wherein an amount of said first cache history storage allocated at each client sender device and a receiver device is fixed, whereby, as new messages are sent or received, older one or more sub-tree or tree fragments one(s) are discarded as corresponding string messages are dropped in said first cache storage.

29. The apparatus as claimed in claim 21, wherein an amount of first cache storage allocated at each client sender device and a receiver device is adaptable for expansion as long as each cache history storage amount at said receiver is equal to or greater than at said sender device.

30. The apparatus as claimed in claim 21, further comprising: means for continuously updating said built intermediate data representations of said identical portions in said first cache history storage at said sender and receiver devices as new messages are sent and received.

31. A program storage device readable by a machine, tangibly embodying a program of instructions executable by the machine to perform method steps for communicating messages, said program storage device executing instructions for performing method steps of:

allocating an amount of a first cache storage at each of a sender device and a receiver device, said cache for storing character strings corresponding to communicated and received message strings at respective sender and receiver devices; and, building an intermediate data structure representing a message to be communicated, said intermediate data structure adapted for storage in a second cache storage at said sender device; and, building a message string to be communicated based on said built intermediate data structure; and, for each subsequent message to be communicated:

identifying portions in a built intermediate data structure for a current message being built with portions that are identical to like portions present in a built intermediate data structure corresponding to a prior communicated message string;

building a message string to be communicated based on said current built intermediate data structure and replacing each identified portion in message strings with a reference indicator to a location in said first cache storage corresponding to an identical character string portion associated with the prior message that has been communicated; and, at said receiver device, identifying a reference indicator in a received message string and substituting one or more cached identical character string portions stored in said first cache storage at said receiver device to build the received message, whereby message communication infrastructure resources at said sending and receiving device are conserved.

* * * * *